United States Patent
Hessler

(10) Patent No.: US 9,770,014 B2
(45) Date of Patent: Sep. 26, 2017

(54) SANITIZATION SYSTEM FOR AN EGG PROCESSING APPARATUS, AND ASSOCIATED METHOD

(71) Applicant: ZOETIS SERVICES LLC, Florham Park, NJ (US)

(72) Inventor: Thomas Matthew Hessler, Raleigh, NC (US)

(73) Assignee: Zoetis Services LLC, Parsippany, NJ (US)

( * ) Notice: Subject to any disclaimer, the term of this patent is extended or adjusted under 35 U.S.C. 154(b) by 195 days.

(21) Appl. No.: 14/792,026

(22) Filed: Jul. 6, 2015

(65) Prior Publication Data
US 2016/0007575 A1    Jan. 14, 2016

Related U.S. Application Data

(60) Provisional application No. 62/022,455, filed on Jul. 9, 2014.

(51) Int. Cl.
*A01K 43/00* (2006.01)
*A01K 45/00* (2006.01)

(52) U.S. Cl.
CPC .......... *A01K 43/005* (2013.01); *A01K 45/007* (2013.01)

(58) Field of Classification Search
CPC ......... A01K 45/007; A01K 45/00; G01N 1/34
USPC ....................................................... 119/6.8
See application file for complete search history.

(56) References Cited

U.S. PATENT DOCUMENTS

| 5,136,979 | A * | 8/1992 | Paul | A61D 19/04 |
| | | | | 119/6.8 |
| 5,176,101 | A * | 1/1993 | Paul | A01K 45/007 |
| | | | | 119/6.8 |
| 6,240,877 | B1 * | 6/2001 | Bounds | A01K 45/007 |
| | | | | 119/6.8 |
| 6,244,214 | B1 * | 6/2001 | Hebrank | A01K 45/007 |
| | | | | 119/6.8 |
| 6,286,455 | B1 * | 9/2001 | Williams | A01K 45/007 |
| | | | | 119/6.8 |
| 7,041,439 | B2 * | 5/2006 | Phelps | A01K 45/00 |
| | | | | 119/6.8 |
| 7,096,820 | B2 * | 8/2006 | Correa | A01K 45/007 |
| | | | | 119/6.8 |
| 7,430,987 | B2 * | 10/2008 | Smith | A01K 45/007 |
| | | | | 119/6.8 |

(Continued)

FOREIGN PATENT DOCUMENTS

WO    WO 2007/106203 A2    9/2007

OTHER PUBLICATIONS

PCT International Search Report and Written Opinion, International Application No. PCT/US2015/039528, dated Sep. 24, 2015.

*Primary Examiner* — Yvonne Abbott-Lewis
(74) *Attorney, Agent, or Firm* — Scott C. Mayhew

(57) ABSTRACT

An egg processing apparatus is provided. Such an apparatus includes a plurality of egg processing devices configured to interact with an avian egg. A sanitization system is in fluid communication with the egg processing devices. The sanitization system is configured to deliver sanitizing fluid to the egg processing devices for sanitization thereof after interaction with an egg. The sanitization system has a valve-less manifold assembly. An associated method is also provided.

13 Claims, 16 Drawing Sheets

(56) References Cited

U.S. PATENT DOCUMENTS

| | | | | |
|---|---|---|---|---|
| 7,438,019 B2* | 10/2008 | Lofink, Jr. | A01K 45/007 | 119/6.8 |
| 7,617,795 B2* | 11/2009 | Wolfe | A01K 45/007 | 119/6.8 |
| 7,721,674 B2* | 5/2010 | Smith | A61D 1/025 | 119/6.8 |
| 7,958,843 B2* | 6/2011 | Correa | A01K 45/007 | 119/6.8 |
| 8,201,518 B2* | 6/2012 | Smith | A61D 1/025 | 119/6.6 |
| 9,241,477 B2* | 1/2016 | Mukaddam | A01K 45/007 | |
| 2003/0056729 A1 | 3/2003 | Correa et al. | | |
| 2009/0000554 A1* | 1/2009 | Hebrank | A01K 45/007 | 119/6.8 |

* cited by examiner

SANITIZATION SYSTEM FOR AN EGG PROCESSING APPARATUS, AND ASSOCIATED METHOD

CROSS REFERENCE TO RELATED APPLICATION

This application claims the benefit of U.S. Provisional Patent Application No. 62/022,455, filed Jul. 9, 2014, which is expressly incorporated herein by reference in its entirety.

TECHNICAL FIELD

The present disclosure generally relates to egg processing devices and systems. More particularly, the present disclosure relates to a sanitization system for an avian egg processing system capable of sanitizing a plurality of egg processing devices, and an associated method.

BACKGROUND

Injections of various substances into avian eggs have been employed to decrease post-hatch mortality rates, increase the potential growth rates or eventual size of the resulting chicken, and even to influence the gender determination of the embryo. Similarly, injections of antigens into live eggs have been employed to incubate various substances used in vaccines which have human or animal medicinal or diagnostic applications. Examples of substances that have been used for, or proposed for, in ovo injection include vaccines, antibiotics and vitamins. In addition, removal of material from avian eggs has been employed for various purposes, such as testing and vaccine harvesting.

Poultry eggs (hereinafter "eggs") may be typically inoculated on or about the eighteenth day of incubation using in ovo injection systems. Typically, eggs are held in flats on racks in carts for incubation in relatively large incubators. At a selected time, typically on the eighteenth day of age, a cart of eggs is removed from the incubator for the purposes of inoculation. In some instances, all eggs are inoculated, including non-viable eggs. In other instances, however, separating out non-viable eggs (namely, dead eggs, rotted eggs, empties, and clear eggs) and inoculating only the live eggs may occur at the eighteenth day of incubation.

Conventionally, devices for injecting material into eggs and for removing material from eggs are configured to pierce and enter an egg along a generally vertical direction. Eggs are generally positioned in an upright, vertical orientation with the longitudinal axis of the egg substantially aligned with vertical. Egg injection techniques incorporate aseptic (sterile) introduction of a needle and/or punch through the shell of an egg and subsequently through the membrane below the blunt end of an egg. The sterility of the injection solution (diluent or media) should be maintained. The introduction of bacteria, microbes, viruses and other pathogens into a developing embryo may be lethal as well as cause depressed growth and development if the embryo survives.

Typically, in ovo injection systems address the issue of pathogen invasion through the use of sanitizing fluid (e.g., a buffered chlorine solution) that bathes various components of the injection device (e.g., the needle and/or punch) between egg injections. In this regard, the exterior and interior (lumen) of punch/needle injection devices may be flushed with sanitizing fluid between injections.

FIG. 1 illustrates a conventional manifold assembly 1 implemented in a sanitization system for an in ovo injection system. The manifold assembly 1 includes a plurality of fluid check valves 5 coupled to an upper manifold 2. Sanitizing fluid is supplied to each fluid check valve 5. The sanitizing fluid opens the fluid check valves 5 and fills adjacent wells defined within the upper manifold 2. Air is supplied to the upper manifold 2 from both ends via elbow connectors 7 and air check valves 8. Air pressure pushes the sanitizing fluid down into a plurality of fluid paths at the bottom of each well and extending into a lower manifold 3 coupled to the upper manifold 2, such that sanitizing fluid is delivered to individual egg injection devices via appropriate tubing. The fluid check valves 5 prevent fluid from backing up to a splitter manifold that supplies fluid to each fluid check valve 5 via a pump assembly.

Such conventional systems, however, implement complex sanitization systems having valves and other components that require significant servicing and maintenance efforts. In addition, such systems may provide variability in the volume of sanitizing fluid provided to each injection device.

Accordingly, it would be desirable to provide an egg processing system capable of minimizing the variation in dispense volume of sanitizing fluid among a plurality of individual egg injection devices, while also decreasing the servicing efforts to maintain a sanitization system of the egg processing system in a functioning manner. Furthermore, it would be desirable to provide an associated method that would facilitate improved performance with respect to delivering consistent amounts of sanitizing fluid among a plurality of individual egg injection devices, as well as improving dispense accuracy.

BRIEF SUMMARY

The above and other needs are met by aspects of the present disclosure which, according to one aspect, provides an egg processing apparatus having a plurality of egg processing devices configured to interact with an avian egg. A sanitization system is in fluid communication with the egg processing devices. The sanitization system is configured to deliver sanitizing fluid to the egg processing devices for sanitization thereof after interaction with an egg. The sanitization system has a valve-less manifold assembly.

Another aspect provides a method of delivering sanitization fluid for an egg processing apparatus. The method comprises supplying sanitizing fluid under pressure to a fluid inlet of a valve-less manifold assembly in fluid communication with a plurality of egg processing devices. The method further comprises delivering sanitizing fluid to a plurality of fluid outlets of the valve-less manifold assembly, the fluid outlets being in fluid communication with respective egg processing devices. The method further comprises delivering sanitizing fluid to the egg process devices for sanitization thereof upon interaction with an egg during an egg processing event.

Thus, various aspects of the present disclosure provide advantages, as otherwise detailed herein.

BRIEF DESCRIPTION OF THE DRAWINGS

Figure 1:
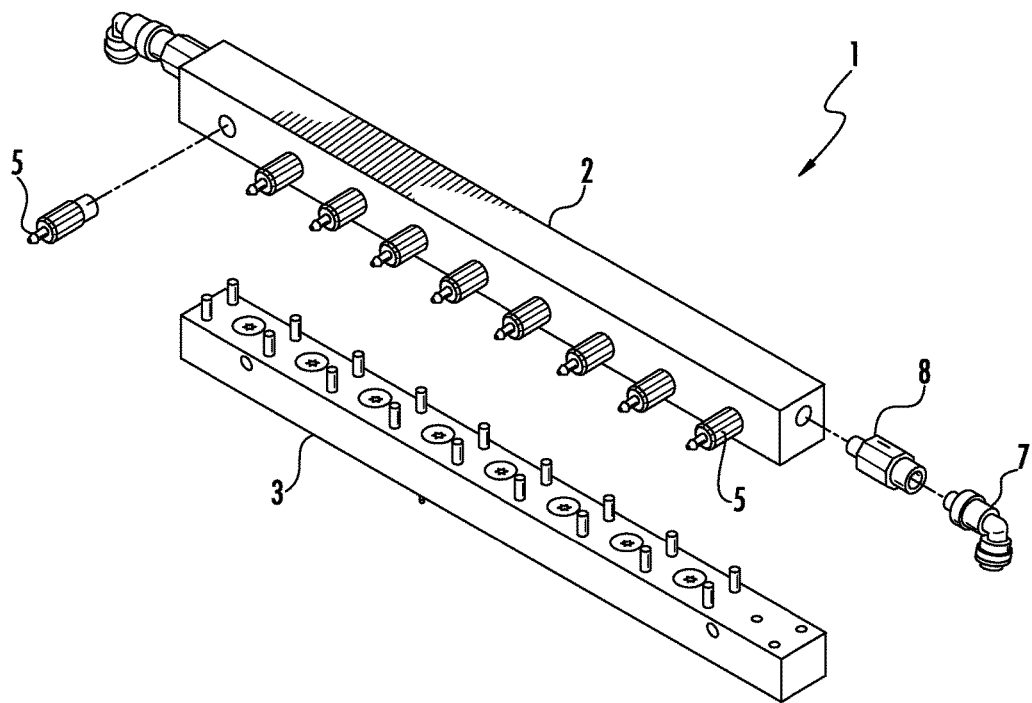
Figure 2:
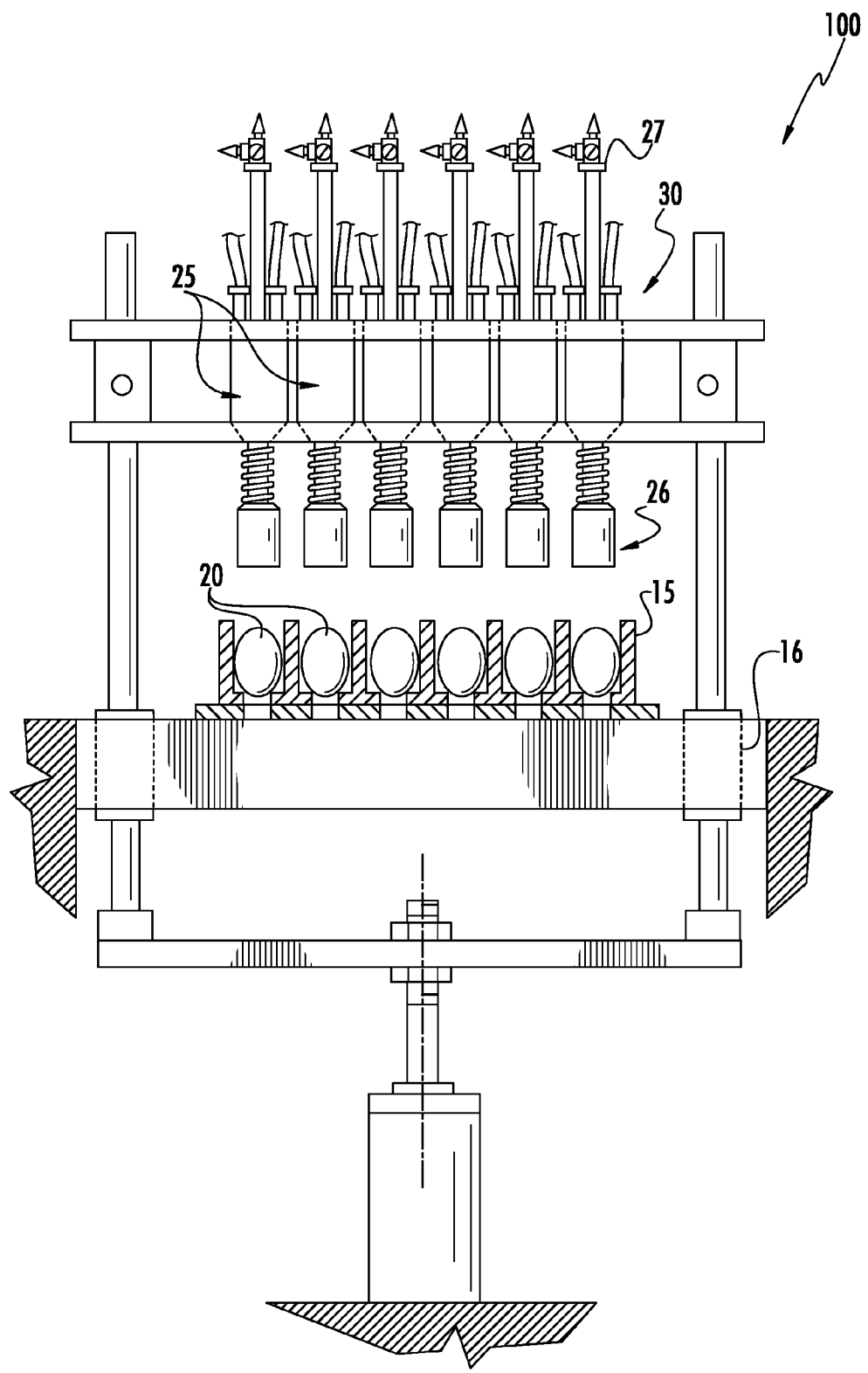
Figure 3:
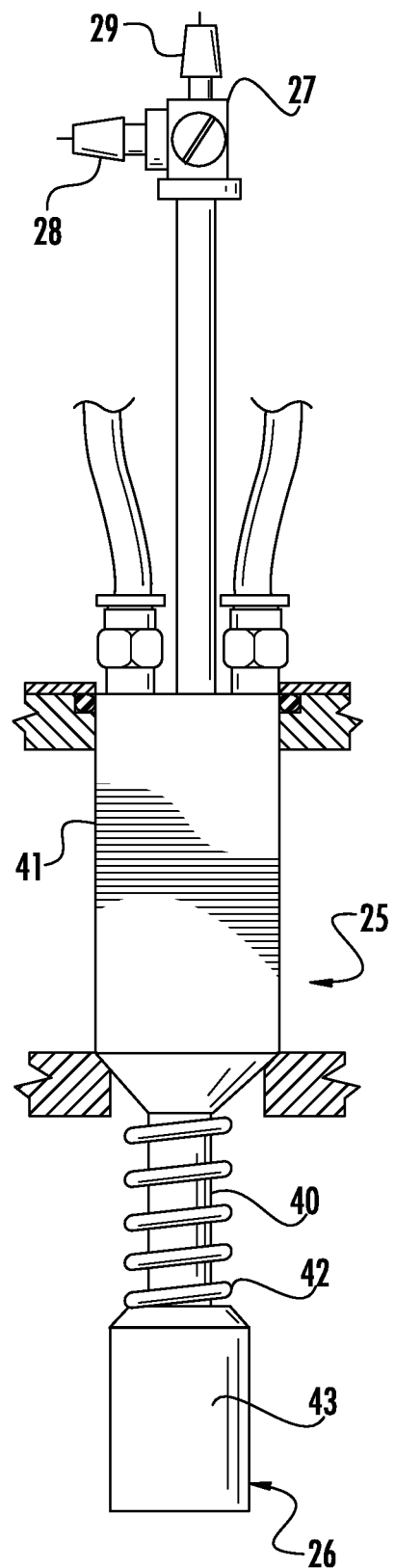
Figure 4:
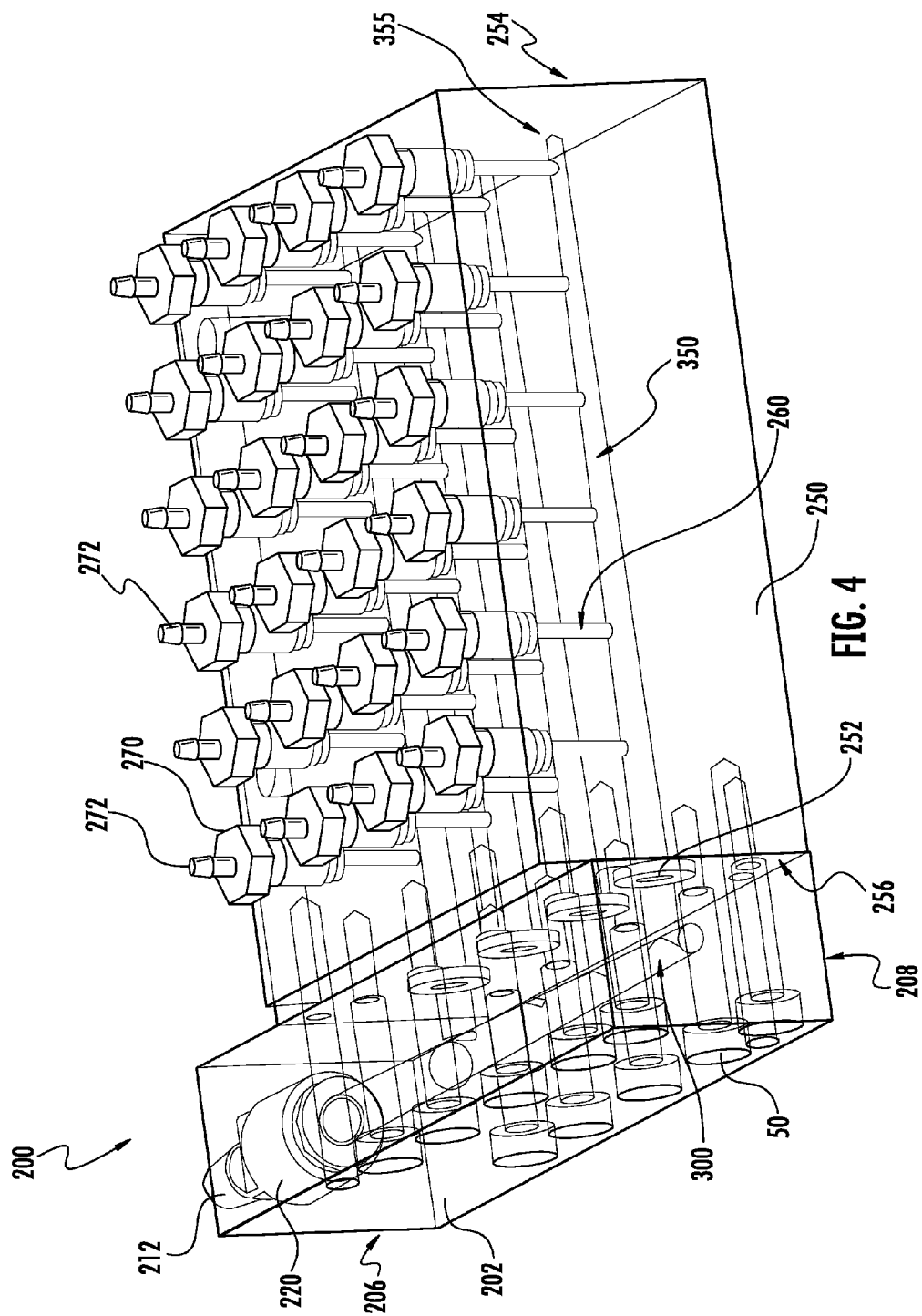
Figure 5:
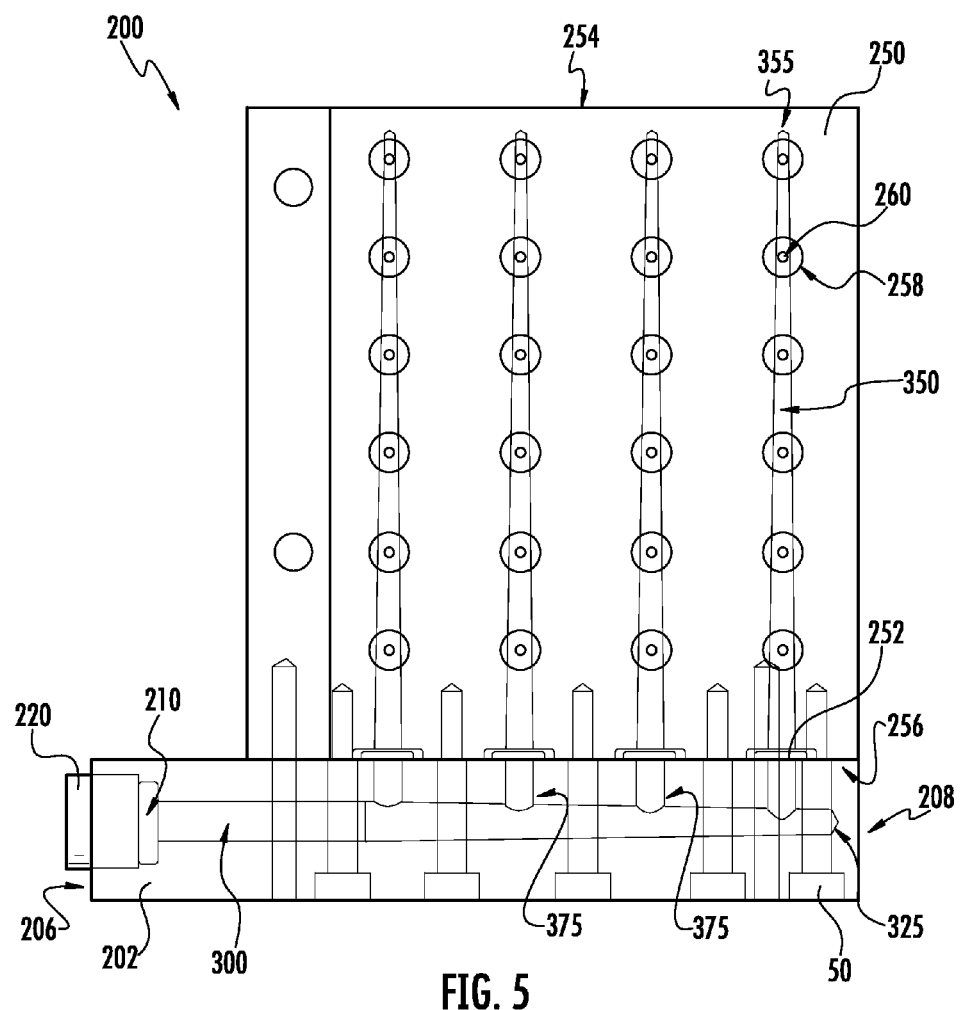
Figure 6:
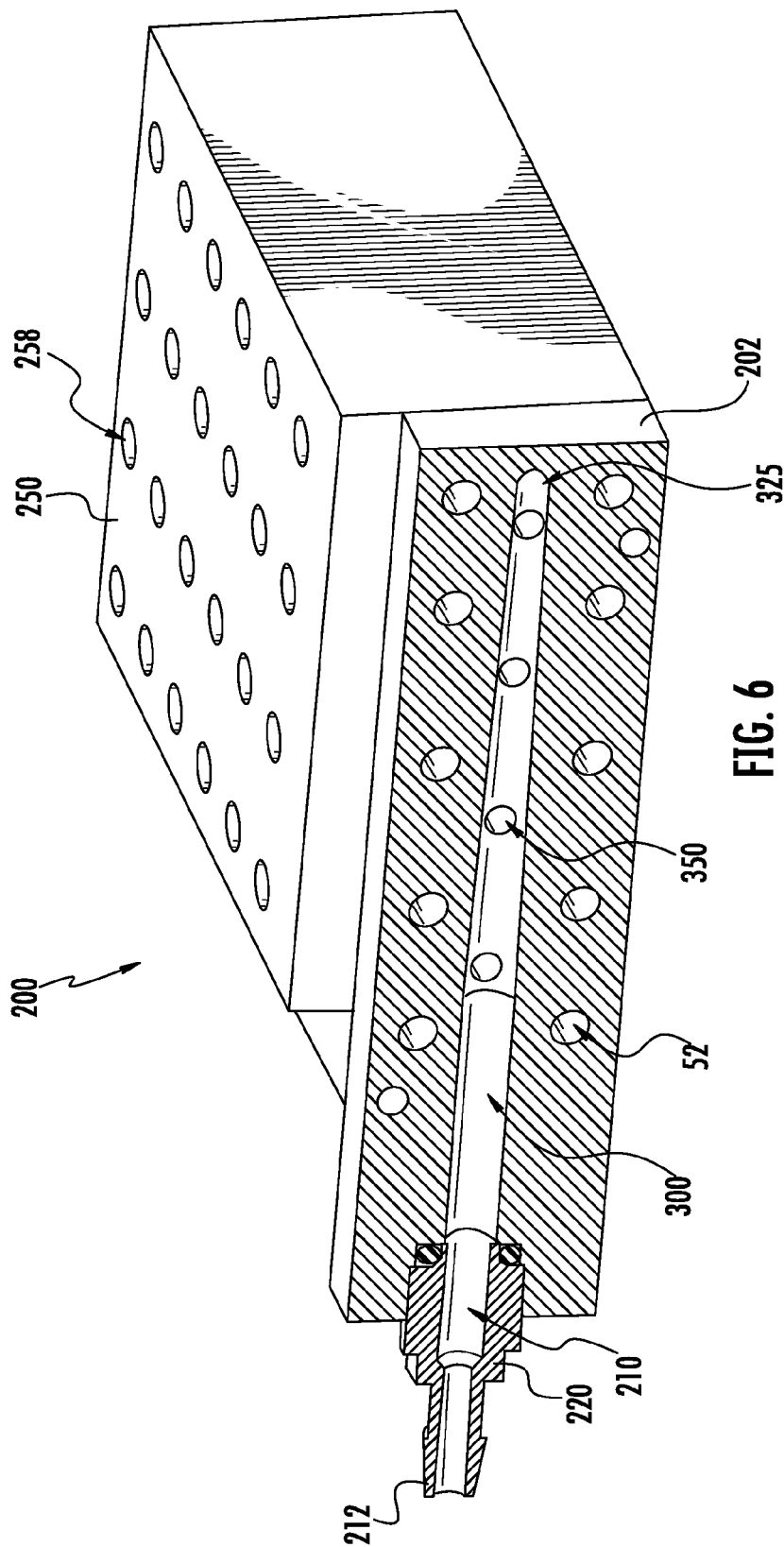
Figure 7:
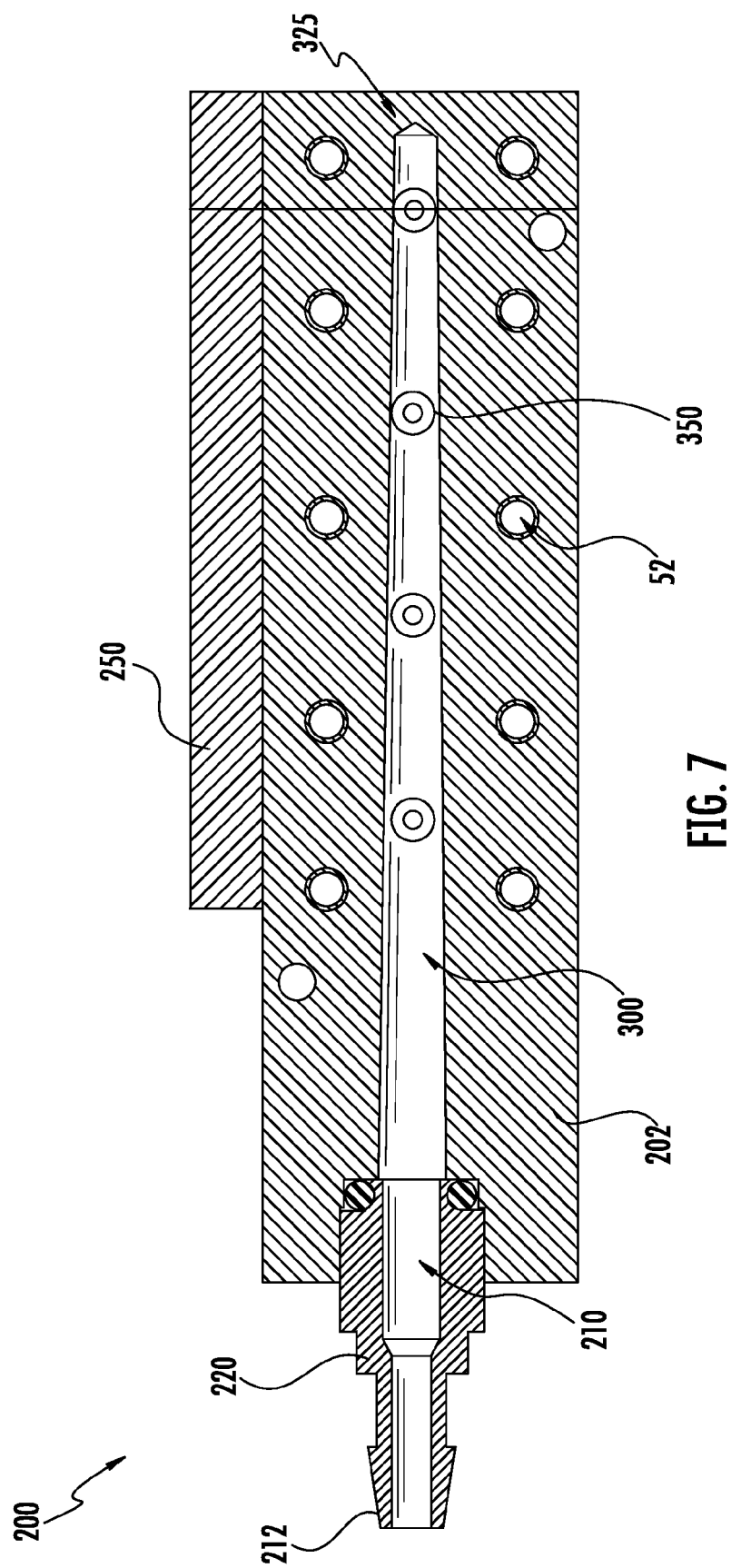
Figure 8:
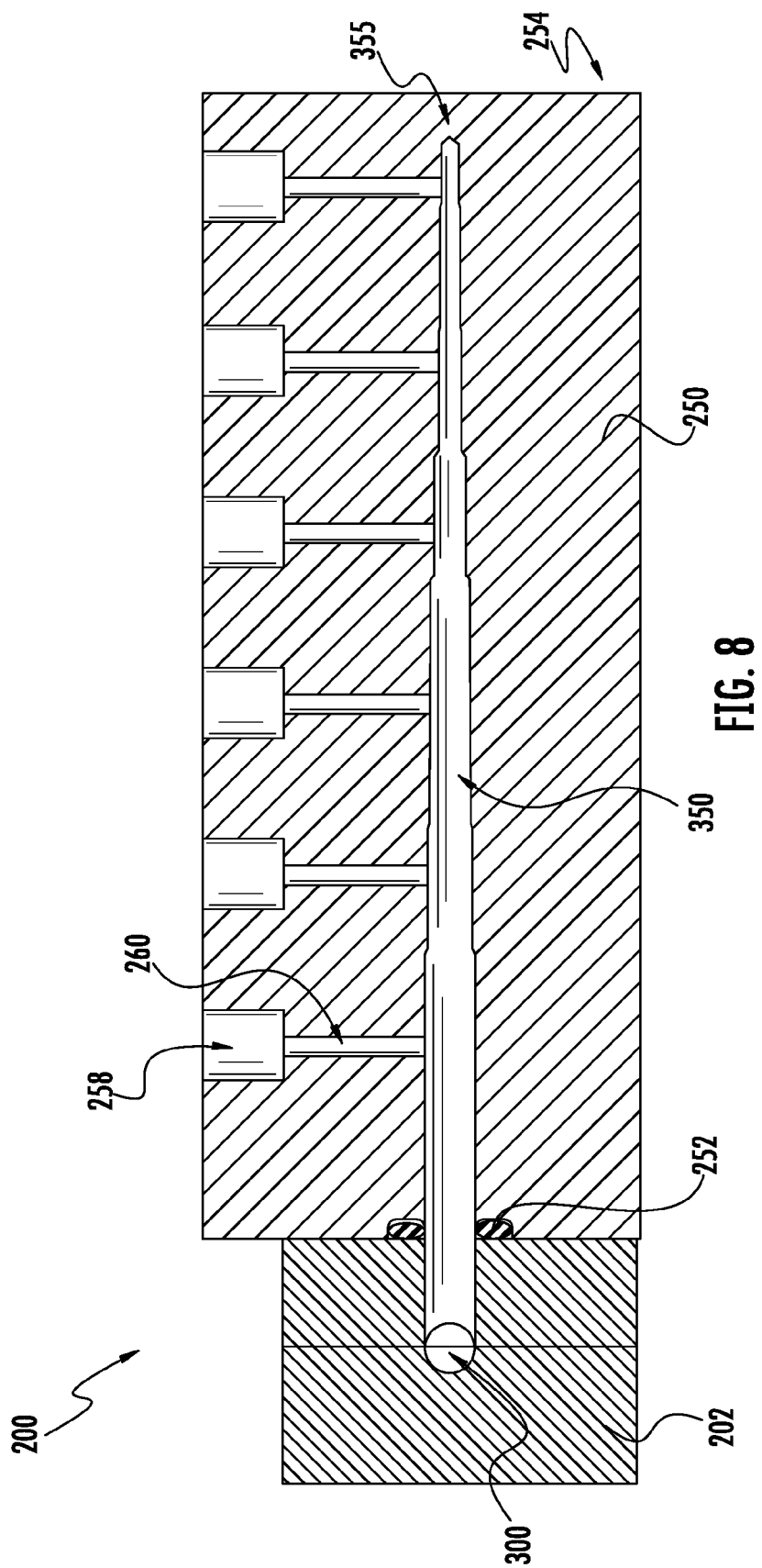
Figure 9:
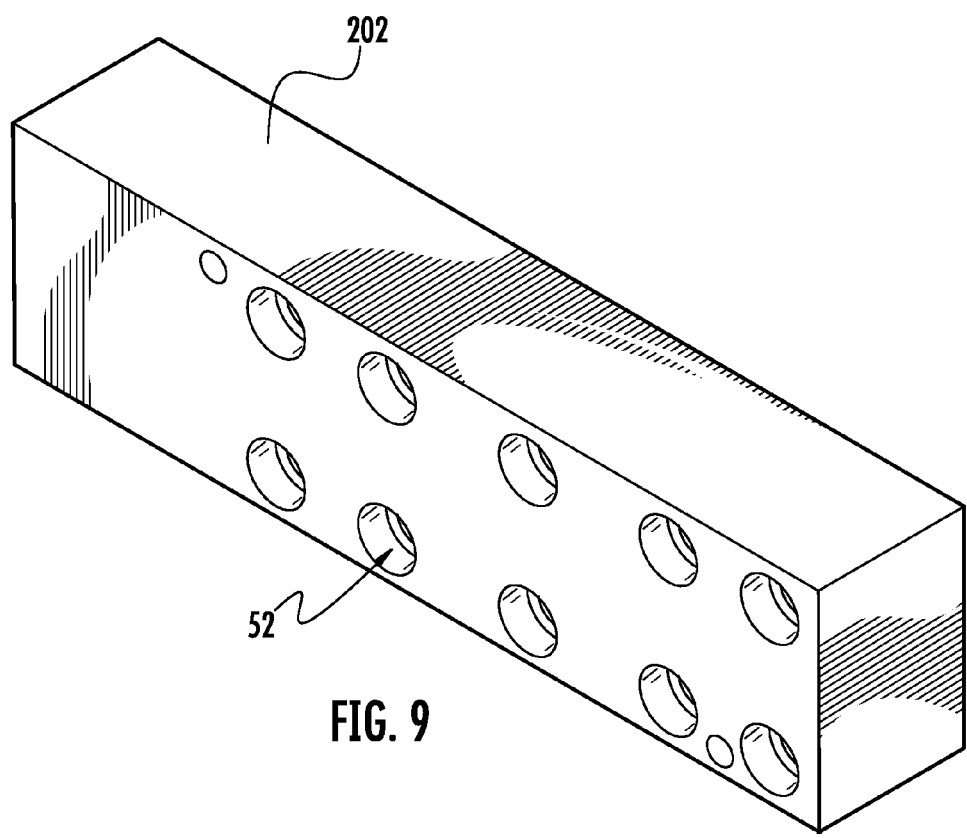
Figure 10:
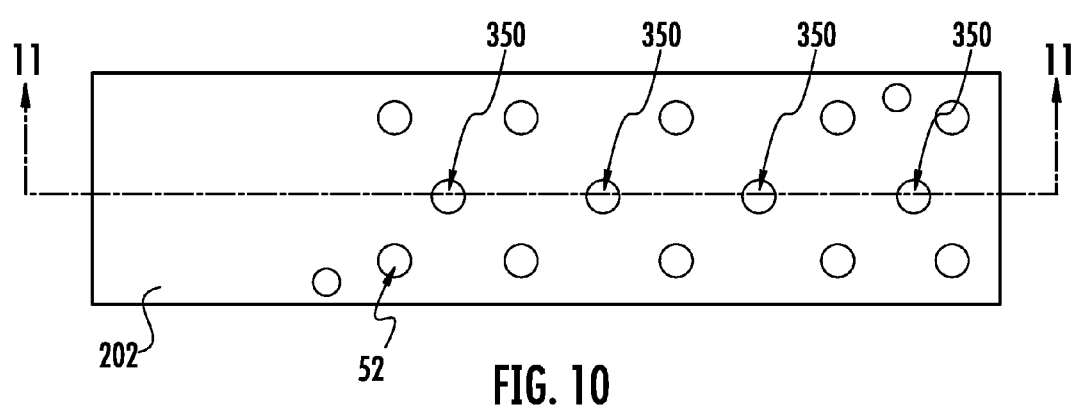
Figure 11:
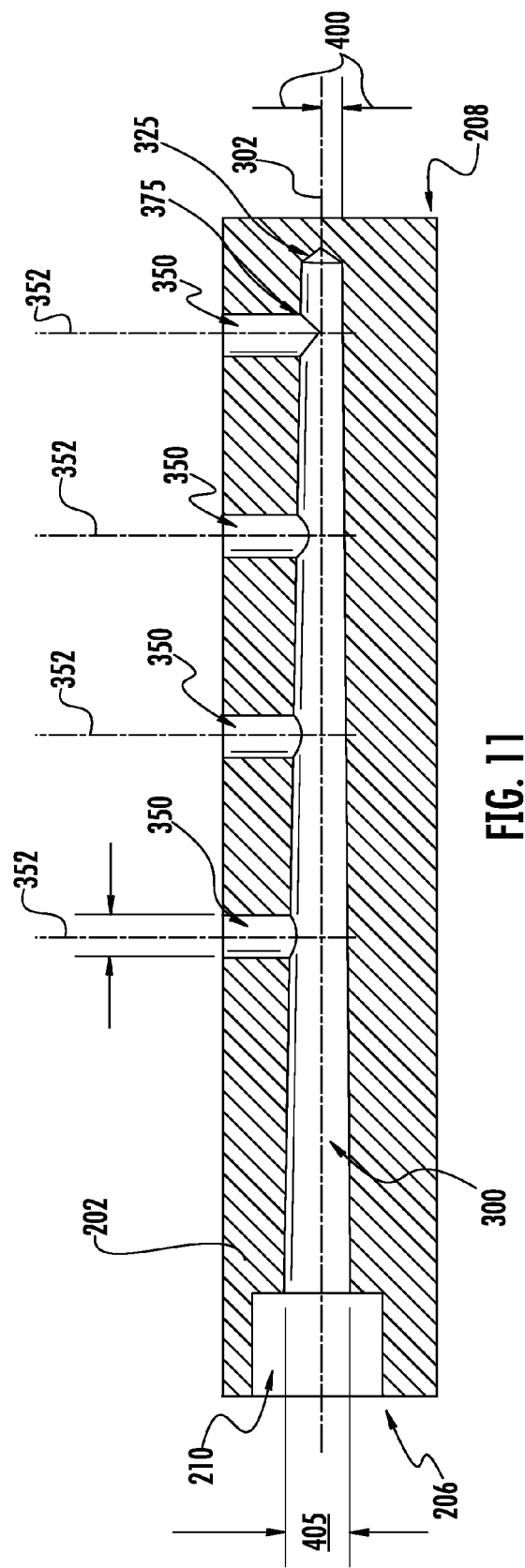
Figure 12:
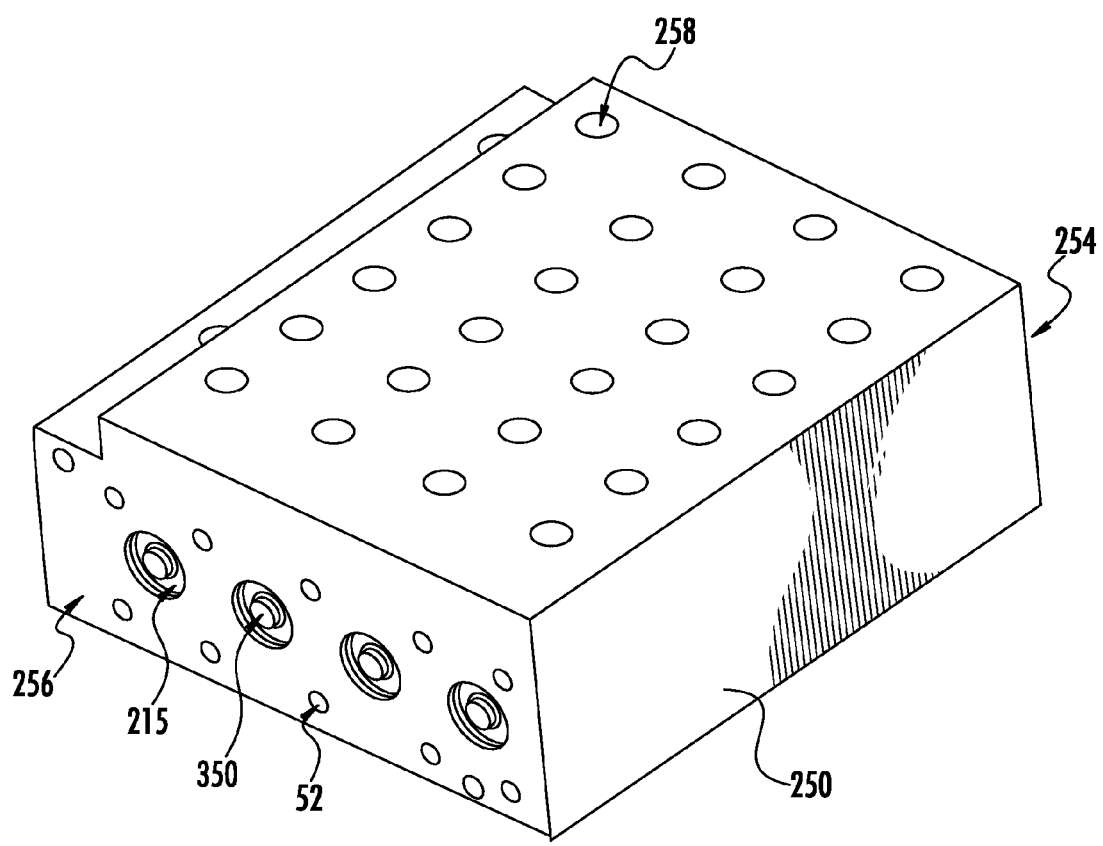
Figure 13:
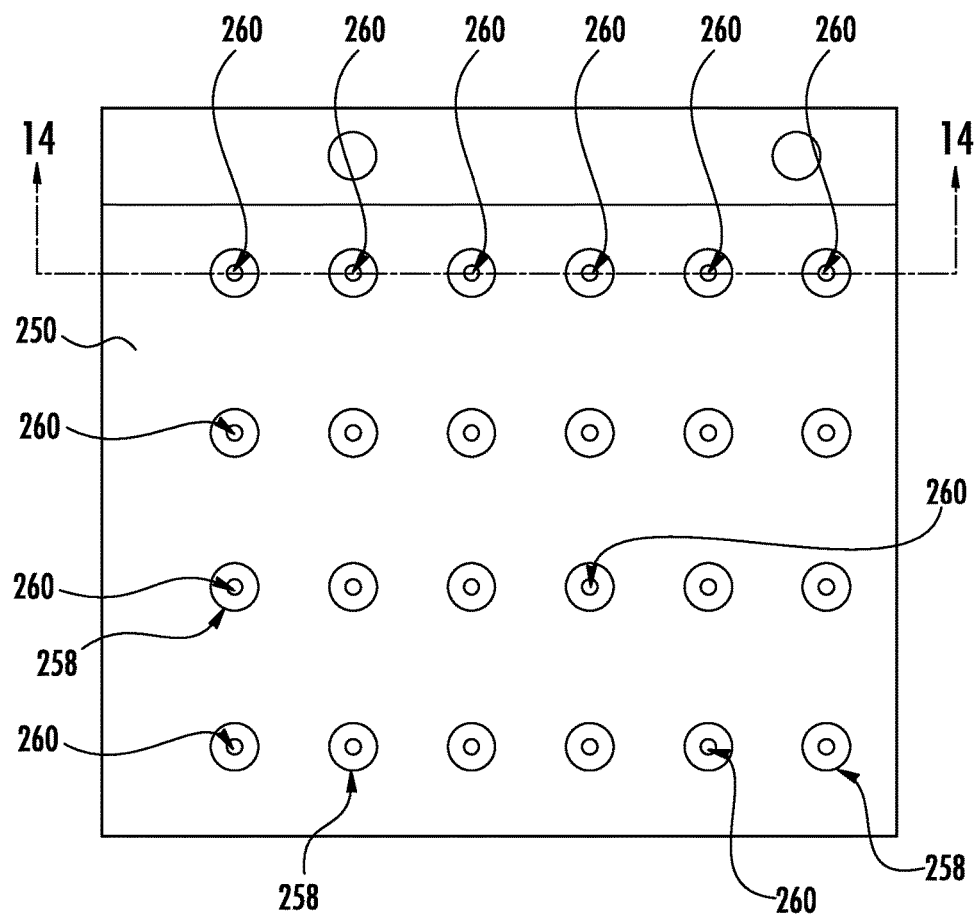
Figure 14:
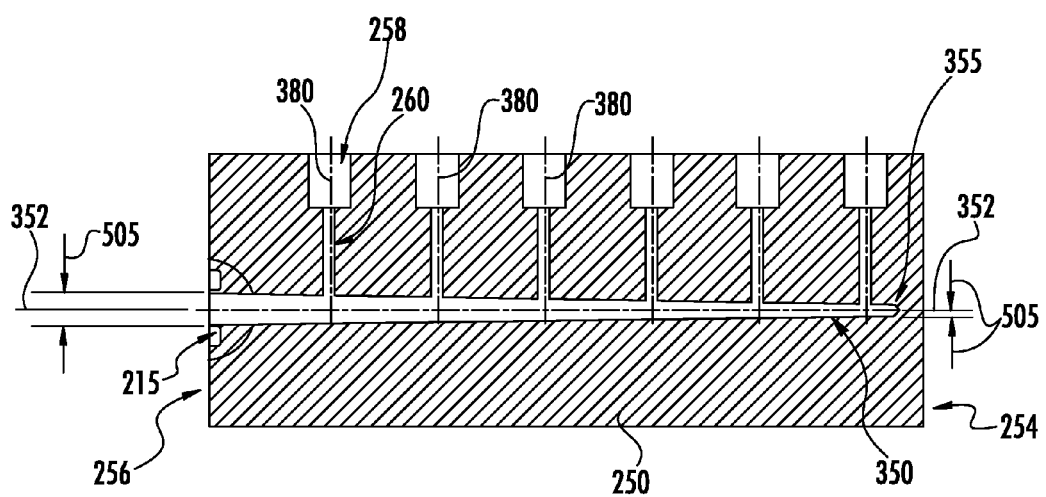
Figure 15:
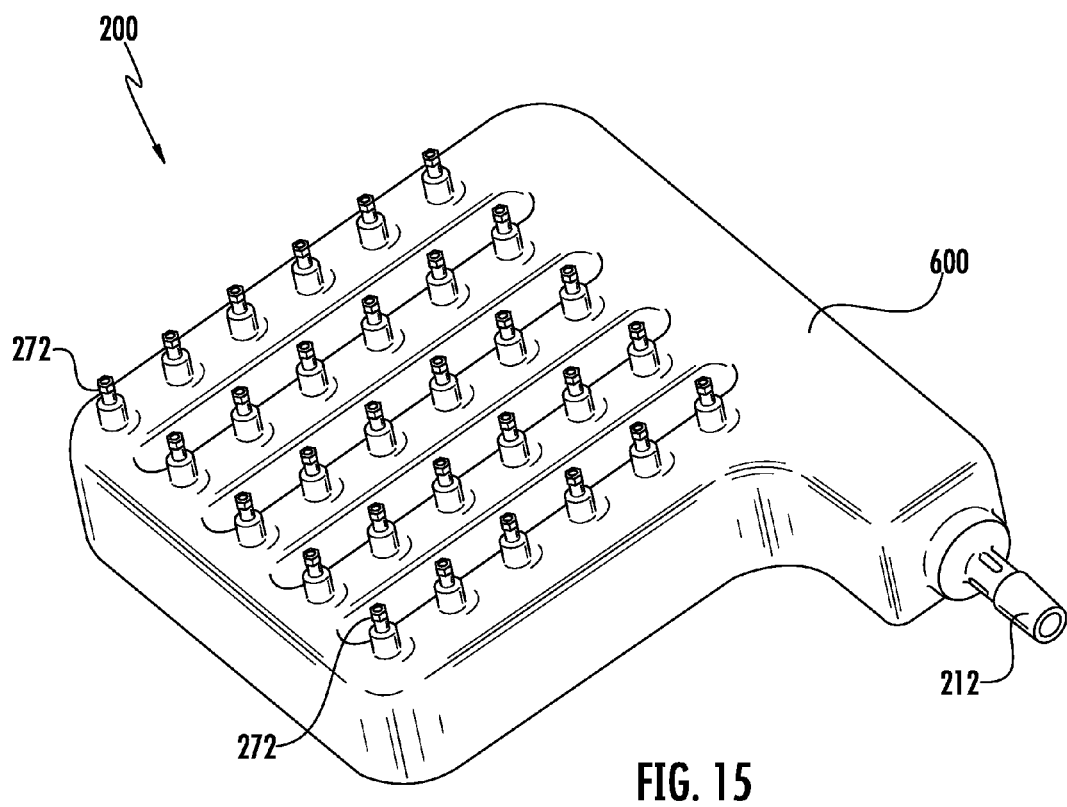
Figure 16:
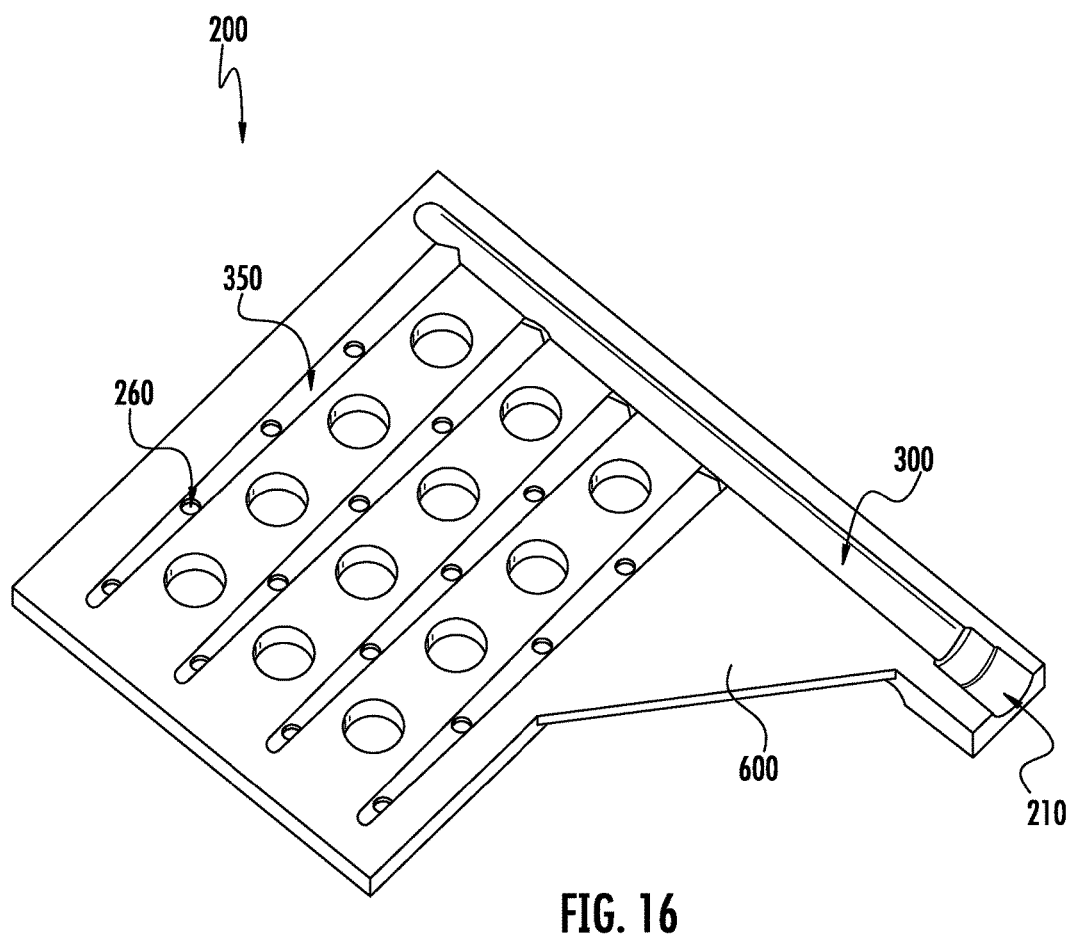

Having thus described various embodiments of the present disclosure in general terms, reference will now be made to the accompanying drawings, which are not necessarily drawn to scale, and wherein:

FIG. 1 is a partial exploded perspective view of prior art manifold assembly implemented in a sanitization system for an egg processing apparatus;

FIG. 2 is a side view of an egg processing apparatus having an injection head assembly;

FIG. 3 is an enlarged view of an injection device in the injection head assembly of FIG. 2;

FIG. 4 is a perspective view of a manifold assembly for use in a sanitization system of an egg processing apparatus, according to one aspect of the present disclosure;

FIG. 5 is a plan view of the manifold assembly shown in FIG. 4;

FIG. 6 is a cross-sectional perspective view of the manifold assembly shown in FIG. 4;

FIG. 7 is a cross-sectional elevation view of the manifold assembly shown in FIG. 4;

FIG. 8 is a cross-sectional side view of the manifold assembly shown in FIG. 4;

FIG. 9 is a schematic perspective view of a manifold cap for a manifold assembly, according to one aspect of the present disclosure;

FIG. 10 is a side view of the manifold cap shown in FIG. 9;

FIG. 11 is a cross-section of the manifold cap shown in FIG. 10 taken along line 11-11;

FIG. 12 is a schematic perspective view of a manifold body for a manifold assembly, according to one aspect of the present disclosure;

FIG. 13 is a plan view of the manifold body shown in FIG. 12;

FIG. 14 is a cross-section of the manifold body shown in FIG. 13 taken along line 14-14;

FIG. 15 is a schematic perspective view of an integrally formed manifold assembly for use in a sanitization system of an egg process apparatus, according to one aspect of the present disclosure; and FIG. 16 is a cross-sectional perspective view of an integrally formed manifold assembly for use in a sanitization system of an egg process apparatus, according to one aspect of the present disclosure.

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

The term "treatment substance" are used herein refers to a substance that is injected into an egg to achieve a desired result. Treatment substances include but are not limited to vaccines, antibiotics, vitamins, virus, and immunomodulatory substances. Vaccines designed for in ovo use to combat outbreaks of avian diseases in hatched birds are commercially available. Typically, the treatment substance is dispersed in a fluid medium, (e.g., a fluid diluent or emulsion) or is a solid dissolved in a fluid, or a particulate dispersed or suspended in a fluid.

Referring to FIG. 2, an exemplary egg processing apparatus 100 is illustrated and includes a flat 15 for carrying eggs, a stationary base 16, and a plurality of conventional egg processing devices 25, such as, for example, injection devices, forming an processing head assembly 30, with fluid delivery means such as lumens or needle(s) positioned therein in accordance with known techniques. The egg processing apparatus 100 may include a frame and a conveyor assembly provided to move the flat 15 in an automated manner through the egg processing apparatus 100 to an injection position. The flat 15 holds a plurality of eggs 20 in a substantially upright position. The flat 15 is configured to provide external access to predetermined areas of the eggs 20. Each egg is held by the flat 15 so that a respective end thereof is in proper alignment relative to a corresponding one of the egg processing devices 25 as the egg processing device 25 advances towards the base 16 of the apparatus. As used herein, a "lumen" is a cavity or inner open space of a tube which can be provided by a syringe or needle. A lumen for delivery of a treatment substance may be within a needle, or between a needle and an outer guide or sleeve. Multiple lumens may be formed within a single needle, with the outlet ports positioned on different locations on the needle.

Each of the egg processing devices 25 has opposing first and second ends 26, 27. The egg processing devices 25 have a first extended position and a second retracted position. Upon extension of the egg processing device 25, the first end 26 is configured to contact and rest against predetermined areas of the external egg shell. When not injecting, the egg processing devices 25 are retracted to rest a predetermined distance above the eggs and stationary base 16. As shown in FIG. 3, the second end 27 of the egg processing device 25 includes first and second inlet ports 28, 29, which are configured to receive tubing respectively from fluid supply means such as, for example, treatment substance chambers. The treatment substances can then be delivered within the needle along separate delivery paths, such as the lumen of an inner needle, and the space between the inner needle and a guide punch. For example, first inlet port 28 may be coupled to tubing that provides a sanitizing fluid to the egg processing device 25 such that the inner needle and/or guide punch may be bathed with sanitizing fluid, while second inlet port 29 may be coupled to tubing that delivers a treatments substance (e.g., vaccine) to the egg processing device 25.

With continuing reference to FIG. 3, the illustrated egg processing device 25 includes a body member 40 having opposing top and bottom end portions 41, 43 received within an elongate longitudinal aperture of the processing head assembly 30. The egg processing device 25 includes an egg locating member, or egg engaging member, on end portion 26, which is slidably connected to the body member 40 and includes a spring 42 to both cushion the engagement, and hold the egg in place during the downstroke of the egg processing device 25. An outer guide is provided to pierce the egg shell, and a needle then extends beyond the outer guide and into the desired compartments of the egg. The egg processing devices 25 may include inlet valves configured to connect to a pneumatic source capable of operating the egg processing devices 25.

While the egg processing devices described herein with respect to FIGS. 2 and 3 are injection type devices, the egg processing devices may also be sampling devices that are configured to extract or remove a sample material from the egg, including removing interior portions thereof and/or portions of the egg shell.

The egg processing apparatus 100 may include a sanitization system capable of supplying or otherwise delivering sanitizing fluid to various components or parts of the egg processing devices 25 so that such components or parts thereof may be sanitized between injection (or sampling) sequences, to minimize cross-contamination of subsequent eggs being processed by the same egg processing devices 25. Sanitization of a sampling device may be particularly provided when extracting a sample material for analysis in determining a characteristic (e.g., gender, health, etc.) of the embryo. In this regard, any residual of the prior sample material may compromise the assay analysis of the subsequent sample material.

According to aspects of the present disclosure, the sanitization system may include one or more manifold assemblies 200 capable of supplying or delivering sanitizing fluid to the egg processing devices 25 for sanitizing various components thereof. Each manifold assembly 200 may be in fluid communication with a pump system capable of supplying sanitizing fluid to the manifold assembly from a fluid reservoir containing sanitizing fluid. In this regard, the sanitizing fluid may be provided under pressure to each manifold assembly 200. The manifold assembly 200 may be oriented or arranged in any manner, without significant effect on performance in regard to accuracy, dispense volume and repeatability.

In some instances, the manifold assembly 200 may be valve-less. In this regard, the manifold assembly 200 may be configured in such a manner that valves (e.g., check valves) are not provided, which may desirably reduce the maintenance needs in keeping the sanitization system properly functioning. That is, in some instances, the manifold assembly 200 may be devoid of any valves that affect fluid flow through the fluid paths of the manifold assembly 200 such that no moving parts are provided in the manifold assembly 200 in order to dispense sanitizing fluid.

According to one aspect of the present disclosure, as shown in FIGS. 4-14, the manifold assembly 200 may include a manifold cap 202 and a manifold body 250. In some instances, the manifold cap 202 and the manifold body 250 may be discrete components that may be coupled using fasteners 50, which may be received within appropriate fastener apertures 52 defined by the manifold cap 202 and the manifold body 250. In other instances, manifold cap 202 and manifold body 250 may be provided as an integrally-formed unitary piece.

According to various aspects of the present disclosure, the manifold assembly 200 may include a main fluid channel 300 through which sanitizing fluid is directed. In some instances, the main fluid channel 300 may be defined by the manifold cap 202. In such instances, the main fluid channel 300 may extend through the manifold cap 202, from a proximal cap end 206 to a distal cap end 208. In some instances, the main fluid channel 300 may taper from the proximal cap end 206 toward the distal cap end 208. In some instances, the main fluid channel 300 may be conically shaped such that a circumference thereof decreases along a length thereof from the proximal cap end 206 toward the distal cap end 208.

The manifold assembly 200 may include a plurality of fluid delivery channels 350 in fluid connection with the main fluid channel 300 and connecting therewith or otherwise branching therefrom at a plurality of fluid junctions 375. In some instances, the fluid delivery channels 350 may extend perpendicularly from the main fluid channel 300 such that a longitudinal axis 302 of the main fluid channel 300 is perpendicular to a central axis 352 of each fluid delivery channel 350.

In some instances, the fluid delivery channels 350 may be entirely defined by the manifold body 250. In other instances, as shown in FIGS. 4-8, the manifold cap 202 may define a portion or section of each fluid delivery channel 350 in addition to the manifold body 250 also defining a portion or section of the fluid delivery channels 350. In such instances, the manifold cap 202 and the manifold body 250 may appropriately mate when coupled such that the sections of the fluid deliver channels 350 defined by the manifold cap 202 are aligned at the fluid junctions 375 with the sections of the fluid delivery channels 350 defined by the manifold body 250. The manifold body 250 may define a plurality of recesses 215 configured to receive a sealing member 252 (e.g., O-ring) provided at a plurality of mating points of the sections of the fluid delivery channels 350 as respectively defined by the manifold cap 202 and the manifold body 250.

In some instances, the fluid delivery channels 350 may taper from the fluid junctions 375 toward a distal body end 254 of the manifold body 250. In other instances, the fluid delivery channels 350 may taper from a proximal body end 256 of the manifold body 250 toward the distal body end 254. In some instances, the fluid delivery channels 350 may be conically shaped such that a circumference thereof decreases along a length thereof from the fluid junction 375 (or proximal body end 256) toward the distal body end 254.

The manifold assembly 200 may include a fluid inlet 210 through which sanitizing fluid enters the manifold assembly 200. In some instances, the manifold cap 202 may define the fluid inlet 210. A fluid inlet port 212 may be in provided in fluid communication with the fluid inlet 210. The fluid inlet port 212 may be configured to receive tubing in a sealing manner such that sanitizing fluid may be supplied to the manifold assembly 200. In some instances, the fluid inlet port 212 may be provided as part of an inlet connector 220 capable of being coupled to the manifold cap 202. The inlet connector 220 may include a threaded portion such that the inlet connector 220 may be screwed into attachment with the manifold cap 202 at the fluid inlet 210. In such instances, the fluid inlet 210 or other portion of the manifold cap 202 may be correspondingly threaded such that the inlet connector 220 may be secured thereto in fluid tight manner.

The manifold assembly 200 may include a plurality of outlet channels 260 extending from or otherwise branching out from the fluid delivery channels 350. In some instances, the outlet channels 260 may extend perpendicularly from respective fluid delivery channels 350 such that the central axis 352 of the fluid delivery channel 350 is perpendicular to a longitudinal axis 380 of each outlet channel 260. The outlet channels 260 may be equidistantly spaced-apart from one another along a length of the fluid delivery channels 350. Each outlet channel 260 may be in communication with a fluid outlet 258, which in some instances may be defined by the manifold body 250.

A fluid outlet port 272 may be in provided in fluid communication with the fluid outlet 258. The fluid outlet port 272 may be configured to receive tubing in a sealing manner such that sanitizing fluid may be delivered from the manifold assembly 200 to the egg processing devices 25. In some instances, the fluid outlet port 272 may be provided as part of an outlet connector 270 capable of being coupled to the manifold body 250. The outlet connector 270 may include a threaded portion such that the outlet connector 270 may be screwed into attachment with the manifold body 250 at the fluid outlet 258. In such instances, the fluid outlet 258 or other portion of the manifold body 250 may be correspondingly threaded such that the outlet connector 270 may be secured thereto in fluid tight manner.

According to some aspects of the present disclosure, as shown in FIGS. 15 and 16, the manifold assembly 200 may be integrally formed as a unitary piece. In this regard, the manifold cap 202 and the manifold body 250 may be an integrally formed single workpiece 600. In some instances, the fluid inlet port 212 and the fluid outlet port 272 may be integrally provided such that separate connectors are not needed to provide connection means for respective tubing.

In some instances, however, some components of the manifold assembly may be discretely provided as separate components, such as, for example, the inlet connector 220 and the outlet connector 270, while other components may be integrally formed.

The manifold assembly 200 may be configured and dimensioned to deliver an accurate and repeatable predetermined amount of sanitizing fluid after each egg processing event (injection or sampling). Such a configuration may advantageously reduce variability in an individual position dispense volume for any given egg processing device 25. That is, the manifold assembly 200 may reduce variability in the volume of sanitizing fluid delivered to an individual egg processing device 25 following each egg processing event. In this regard, each egg processing device 25 may receive a repeatable volume of sanitizing fluid in order to ensure proper sanitization thereof. Such repeatability at relatively small volumes (typically delivering at a target dispense volume somewhere in the range between about 200 microliters and about 300 microliters of sanitizing fluid at each egg processing device 25 per egg processing event) may provide significant advantages in overall performance of the egg processing apparatus 100.

The fluid paths of the manifold assembly 200, as defined by the main fluid channel 300, fluid delivery channels 350, and outlet channels 260, may be configured to provide equal dispense volume to each fluid outlet 258. In this regard, the fluid path geometry may be shaped to control and minimize pressure variations, which in turn minimizes the variation in volume of sanitizing fluid dispensed from each fluid outlet 258.

According to one particular embodiment of the present disclosure, as shown in FIGS. 4-14, the manifold assembly may be dimensioned to minimize pressure drop as the sanitizing fluid is dispensed from the fluid outlets 258. The degree to which the main fluid channel 300 tapers at a tapering angle 400 may be between about 0.5° and 1.5°, and preferably about 1°, with respect to the longitudinal axis 302. An initial diameter 405 of the main fluid channel 300 may be between about 0.22 inches and about 0.23 inches, and preferably about 0.224 inches. In some instances, the main fluid channel 300 may begin tapering at or about at the fluid delivery channel 350 closest to the fluid inlet 210, as shown in FIG. 11 where the main fluid channel 300 begins tapering at or about at the intersection of the longitudinal axis 302 and the central axis 352 of the fluid delivery channel 350 closest to the fluid inlet 210. A length of the main fluid channel 300 may be about 4 inches. The fluid delivery channels 350 may be spaced-apart along the main fluid channel 300 at about 0.7 inches from one another. In some instances, the fluid delivery channel 350 farthest from the fluid inlet 210 may be positioned prior to or spaced from an end 325 of the main fluid channel 300.

The degree to which each fluid delivery channel 350 tapers at a tapering angle 500 may be between about 0.4° and 1.4°, and preferably about 0.9°, with respect to the central axis 352. An initial diameter 505 of each fluid delivery channel 350 may be between about 0.14 inches and about 0.15 inches, and preferably about 0.144 inches. In some instances, each fluid delivery channel 350 may begin tapering at or about at the outlet channel 260 closest to the respective fluid junction 375, as shown in FIG. 14 where the fluid delivery channel 350 begins tapering at or about at the intersection of the central axis 352 and the longitudinal axis of the outlet channel 260 closest to the fluid junction 375. A length of each fluid delivery channel 350 may vary due to the tapering of the main fluid channel 300. In this regard, the length of the fluid delivery channels may range between about 3.63 inches and about 3.75 inches.

The outlet channels 260 may be spaced-apart along the fluid delivery channel 350 at about 0.525 inches from one another. In some instances, each outlet channel 260 farthest from the respective fluid junction 375 may be positioned prior to or spaced from an end 355 of the respective fluid delivery channel 350. The outlet channels 260 may have a diameter of between about 0.055 inches and about 0.065 inches, and preferably about 0.060 inches.

Testing was conducted on a prototype manifold assembly 200 having sixteen fluid outlets 258, as similarly shown in FIG. 16. Three consecutive dispenses were evaluated to determine a minimum dispense volume, a maximum dispense volume, and an average dispense volume. Table 1 provides the results of this testing. The manifold assembly in this testing phase was inverted, with a 10 inch head height.

TABLE 1

|  | Run 1 | Run 2 | Run 3 |
| --- | --- | --- | --- |
| Minimum (microliters) | 234.8 | 233.8 | 232.8 |
| Maximum (microliters) | 279.7 | 276.7 | 274.7 |
| Average (microliters) | 255.0 | 254.2 | 253.5 |
| Standard Deviation | 0.0120 | 0.0122 | 0.0123 |

From Table 1, a summary of data related to the testing is provided in Table 2.

TABLE 2

| Minimum (microliters) | 233 |
| --- | --- |
| Maximum (microliters) | 280 |
| Range of Average Dispense Volume (microliters) | 1.5 |
| Average Dispense Volume (microliters) | 254.2 |

To compare the effect of orientation or head height of the manifold assembly 200, a second set of testing was conducted, with the results shown in Table 3. The manifold assembly in this testing phase was non-inverted, with a zero inch head height.

TABLE 3

|  | Run 1 | Run 2 | Run 3 |
| --- | --- | --- | --- |
| Minimum (microliters) | 234.8 | 234.8 | 233.8 |
| Maximum (microliters) | 277.7 | 278.7 | 276.7 |
| Average (microliters) | 253.6 | 254.1 | 253.2 |
| Standard Deviation | 0.0124 | 0.0124 | 0.0122 |

From Table 3, a summary of data related to the testing is provided in Table 4.

TABLE 4

| Minimum (microliters) | 234 |
| --- | --- |
| Maximum (microliters) | 279 |
| Range of Average Dispense Volume (microliters) | 0.9 |
| Average Dispense Volume (microliters) | 254.0 |

Table 5 shows a comparison between the summary of testing data presented in Tables 2 and 4.

TABLE 5

|  | Inverted | Non-inverted |
|---|---|---|
| Minimum (microliters) | 233 | 234 |
| Maximum (microliters) | 280 | 279 |
| Range of Average Dispense Volume (microliters) | 1.5 | 0.9 |
| Average Dispense Volume (microliters) | 254.2 | 254.0 |

Many modifications and other aspects of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An egg processing apparatus, comprising:
 a plurality of egg processing devices configured to interact with an avian egg; and
 a sanitization system in fluid communication with the egg processing devices, the sanitization system being configured to deliver sanitizing fluid to the egg processing devices for sanitization thereof after interaction with an egg, the sanitization system having a valve-less manifold assembly having a manifold cap and manifold body operably engaged therewith, the manifold cap defining a main fluid channel in fluid communication with a plurality of fluid delivery channels defined by the manifold body, each fluid delivery channel being in fluid communication with a plurality of fluid outlets in fluid communication with a respective egg processing device.

2. An egg processing apparatus according to claim 1, wherein the valve-less manifold assembly is configured to provide an average dispense volume of between about 250 microliters and about 260 microliters among the egg processing devices.

3. An egg processing apparatus according to claim 1, wherein the valveless manifold assembly is configured to maintain a range of average dispense volume at about 1 microliter to about 2 microliters among the egg processing devices.

4. An egg processing apparatus according to claim 1, wherein the processing devices are selected from the group consisting of an injection device configured to deliver a treatment substance to a respective egg and a sampling device configured to extract a sample material from a respective egg.

5. An egg processing apparatus according to claim 1, wherein the valve-less manifold assembly comprises a manifold having a fluid inlet and a plurality of fluid outlets, each fluid outlet being in fluid communication with a respective egg processing device.

6. An egg processing apparatus, comprising:
 a plurality of egg processing devices configured to interact with an avian egg; and
 a sanitization system in fluid communication with the egg processing devices, the sanitization system being configured to deliver sanitizing fluid to the egg processing devices for sanitization thereof after interaction with an egg, the sanitization system having a valve-less manifold assembly comprising a manifold having a fluid inlet and a plurality of fluid outlets, each fluid outlet being in fluid communication with a respective egg processing device, and wherein the manifold comprises a main fluid channel and a plurality of fluid delivery channels extending from the main fluid channel, each fluid delivery channel having a plurality of outlet channels extending therefrom such that each fluid delivery channel is in fluid communication with the fluid outlets via the outlet channels, and further wherein the outlet channels are spaced-apart along the delivery channels.

7. An egg processing apparatus according to claim 6, wherein the main fluid channel is in fluid communication with the fluid inlet, and further wherein the main fluid channel is configured to taper from the fluid inlet.

8. An egg processing apparatus according to claim 6, wherein each fluid delivery channel branches off from the main fluid channel at a respective fluid junction, and further wherein each fluid delivery channel is configured to taper from the respective fluid junction.

9. A method of delivering sanitization fluid for an egg processing apparatus, the method comprising:
 supplying sanitizing fluid under pressure to a fluid inlet of a valve-less manifold assembly in fluid communication with a plurality of egg processing devices;
 delivering sanitizing fluid to a plurality of fluid outlets of the valve-less manifold assembly via a plurality of fluid delivery channels in fluid communication with a main fluid channel in fluid communication with the fluid inlet, the fluid outlets being in fluid communication with respective egg processing devices; and
 delivering sanitizing fluid to the egg process devices for sanitization thereof upon interaction with an egg during an egg processing event.

10. A method according to claim 9, wherein delivering sanitizing fluid to the egg process devices for sanitization thereof comprises delivering sanitizing fluid to the egg processing devices such that variability of an average dispense volume among the egg processing devices is provided between about 250 microliters and about 260 microliters.

11. A method according to claim 9, wherein delivering sanitizing fluid to the egg process devices for sanitization thereof comprises delivering sanitizing fluid to the egg processing devices such that an average dispense volume among the egg processing devices is maintained at a range of about 1 microliter to about 2 microliters.

12. A method according to claim 9, wherein the main fluid channel is configured to taper from the fluid inlet.

13. A method according to claim 9, wherein each fluid delivery channel branches off from the main fluid channel at a respective fluid junction, and further wherein each fluid delivery channel is configured to taper from the respective fluid junction.

* * * * *